(12) United States Patent
Steiner et al.

(10) Patent No.: US 8,718,268 B2
(45) Date of Patent: May 6, 2014

(54) CUSTOMER SERVICE TEAMING

(75) Inventors: Robert C. Steiner, Broomfield, CO (US); Andrew D. Flockhart, Thornton, CO (US); Joylee Kohler, Northglenn, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/407,524

(22) Filed: Feb. 28, 2012

(65) Prior Publication Data
US 2013/0223617 A1    Aug. 29, 2013

(51) Int. Cl.
*H04M 3/00* (2006.01)
*H04M 5/00* (2006.01)

(52) U.S. Cl.
USPC .................. 379/265.11; 379/265.12

(58) Field of Classification Search
USPC ............ 379/265.11, 265.12, 265.13
See application file for complete search history.

(56) References Cited

U.S. PATENT DOCUMENTS

| | | | |
|---|---|---|---|
| 7,110,525 B1 * | 9/2006 | Heller et al. ............ | 379/265.11 |
| 7,773,740 B2 * | 8/2010 | Beckstrom et al. ...... | 379/265.13 |
| 2005/0071241 A1 * | 3/2005 | Flockhart et al. ............... | 705/26 |
| 2006/0182258 A1 * | 8/2006 | Sisselman et al. ....... | 379/265.02 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |

OTHER PUBLICATIONS

Uba, Gene Masaru, U.S. Appl. No. 11/244,358, Entitled "Team of Expert Agents", filed Oct. 4, 2005, 40 pages.

\* cited by examiner

*Primary Examiner* — Ahmad Matar
*Assistant Examiner* — Nafiz E Hoque
(74) *Attorney, Agent, or Firm* — Sheridan Ross P.C.

(57) ABSTRACT

The present disclosure describes various ways of providing agents with a configurable mechanism by which they may bid on training opportunities with contacts in a given contact center. Specifically, an architecture providing a team of agents and agents-in-training to service a contact or set of contacts and methods of employing that team architecture are described. The bids of one or more agents may be collected and evaluated to determine at least one winning agent that will team together with at least one subject matter expert, qualified agent, or team in handling a contact for the purposes of training.

20 Claims, 6 Drawing Sheets

CUSTOMER SERVICE TEAMING

FIELD

The invention relates generally to contact centers and specifically the training of contact center agents.

BACKGROUND

Contact centers can provide numerous services to customers, and have been doing so for years. The idea of a contact center queue is not much different from that of standing in line at a bank and waiting to be helped by the next available teller. However, there can be a lot of frustration if the first, second, or even third teller cannot answer a given question or set of questions. The same frustrations have been known to occur in contact centers. A company can gain customer satisfaction if they are able to answer their customers' questions quickly and accurately.

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

As products and problems become more complex and diverse in nature, a single agent often no longer has all of the skills or expertise to fully service customer contacts. To service customer contacts more effectively, the contact center has dedicated Subject Matter Experts or SMEs, who are highly trained agents in a given aspect of a business. For example, contact centers that handle computer customer service may have application SMEs, hardware SMEs, operating system SMEs, network SMEs, etc. While SMEs are well qualified to answer questions on their particular subject(s), they are often unqualified to answer questions involving subjects outside of their respective specialties.

It is a primary objective of a contact center to provide the best possible service to each individual customer while constantly evaluating and addressing the needs of all contacting customers. This service can best be achieved by offering high-quality technical assistance from a qualified agent coupled with a minimal queue wait time for a customer. In order to facilitate a higher level of service, more qualified agents may be trained as SMEs in various specialties.

Specifically, the best training scenarios involve witnessing how real-world situations are addressed by experienced SMEs. Although simulations can provide a basic level of comprehension in problem solving, real-world scenarios offer insight on how to address unforeseeable issues that may arise in a true customer service contact environment. Additionally, a trainee may benefit from being exposed, in increasing levels of involvement, to a customer and the corresponding service interaction. Unfortunately, this type of high-quality training takes valuable time and resources away from the contact center workflow and may negatively affect the level of immediately available customer service.

Thus, it is a long-felt need in contact center architecture to team trainees with experienced agents and/or SMEs in handling real-world contacts together at a time convenient to each of the agents as well as the customer and the contact center.

SUMMARY

These and other needs are addressed by the various embodiments and configurations of the present invention. The present disclosure recites a method to team trainees with the organized SMEs (disclosed in U.S. patent application Ser. No. 11/244,358, the entire contents of which are hereby incorporated herein by reference) and/or experienced agents for the purposes of engaging in real-world training sessions.

One embodiment of the present disclosure provides a bidding process to team trainees with SMEs and/or experienced agents in handling real-world contact problems. As used herein a "contact" can be a real-time contact like a phone call, voice over IP or VoIP call, chat, and/or video call. Alternatively, or in addition, the contact can be a non-real-time contact like an email, fax, voicemail, telephone transcript, and/or video message. It is anticipated that an agent or group of agents wishing to receive training can selectively bid on teaming with the SME, or some other agent, to handle the problem.

In one embodiment, a method is described, comprising:

receiving a contact with at least a first customer, wherein the contact includes an identifier to classify a contact context;

determining, based on the contact context, whether the contact qualifies as a training event;

in response to determining that the contact qualifies as a training event, selecting one or more resources to participate with the contact;

referring to a first memory location to determine whether the one or more resources will be sent a bid invitation to bid on the training event;

sending the bid invitation to the determined one or more resources;

receiving one or more bid responses from the determined one or more resources;

determining at least one winning bid from the one or more bid responses; and joining the one or more resources associated with the at least one winning bid with the contact.

In some embodiments, a plurality of agents may bid on training opportunities that are either currently being handled by an agent, have yet to be assigned to an agent, or have yet to enter a contact center (e.g., future training opportunities). In any scenario, the bidding process may use different rules to determine whether a trainee is "available" to receive this unique type of training. These rules may include business rules (e.g., skill-based, incentive-based, etc.) to select one or more agents-in-training. Determining the trainee availability may also include without limitation evaluating the state of the contact center (e.g., emergency, snow day, fire drill, contracts, and the like), the contact center traffic volume (current, past, or predicted), the timing of the bid placed by the trainee (e.g., first-in-first-chosen), past trainee performance, past bid success rate, number of training scenarios previously attended, staff levels, trainee experience, pedagogical value, and/or combinations thereof. For example, during periods of high contact traffic, a limited number of training bids may be offered, placed, and/or accepted. In contrast, during periods of low contact volume (or times of predicted low traffic volume) a greater number of bids can be offered, placed, and/or granted thereby creating more customer service training teams. In another embodiment, a trainee who has shown an aptitude for handling more complex calls may be favored in winning bids to complete her training on an expedited schedule.

In some embodiments, the trainee may be alerted of the opportunity to team with an SME and as a result may submit a bid on the opportunity. This alert may be generated and provided via software connected to contact center control equipment. As can be appreciated, the alert can be required, ignored, be closed, be delayed, expire and/or be accepted and may provide a link (e.g., URL or hyperlink) or option for the trainee to submit a bid on the training opportunity. Furthermore, these alerts may be sent to specific agents to expand their training in a given technical area. Determining whether or not to send an alert to a specific agent may depend on the state of the contact center, training needs, career growth, required training, evaluating skills, past training, other business rules, and/or combinations thereof.

In accordance with the present disclosure, the alerts sent to multiple agents may be randomly or predictably staggered. Providing staggered notifications can result in a greater probability that the agent responses will also be staggered. This staggering of alerts and notifications may cause less strain on contact center infrastructure in the event of multiple bids being placed and received simultaneously.

In some embodiments, once a training opportunity is bid upon and won by at least one agent, the alert will expire and prohibit further bidding or acceptance of bids. However, an option may be programmed into the alert to allow agents to request notification of future bids that match similar contact and/or training criteria. In yet another embodiment, bids placed by trainees may be queued ahead of time and stored in a memory. This memory may be referenced to find an agent who may desire further training.

As stated above, a plurality of trainees will have the opportunity to bid on real-world contacts as training scenarios that are in the process of being handled by an agent or those that have yet to be assigned to an agent. In the case of an in-process training scenario, once a bid is won by a particular trainee, the SME and the trainee are teamed together to handle the contact. This teaming process can occur immediately, or it can be delayed for an opportune moment, such as a pause in the conversation or a transfer to another agent. Moreover, the addition of the new agent-in-training to the contact may be announced or made without notifying the customer. The decision to announce the addition of an agent-in-training may depend on the trainee's ability to interact with the customer, contact center policy, and/or the law. For example, if the contact-type is a phone call the trainee may be conferenced in to the call in order to observe and/or participate in the interaction. On the other hand, if the contact is through some other means, like instant messaging or through an interactive webpage, the trainee may share control with the SME, or assume full control, dependent upon the trainee's determined level of involvement with the customer interaction. In some situations, the introduction of a third party (or undisclosed party) to a communication or contact may be required by law. In these scenarios the addition of the previously undisclosed party may be announced prior to adding the previously undisclosed party to the communication or contact.

In the case of contacts that have not yet been assigned, it is anticipated that the agent who wins the bidding process can be connected simultaneously with the servicing agent(s). If the contact is a real-time call, the agents may be conferenced together. If the contact is non-real-time (e.g., email, IM chat, SMS text exchange, etc.), the agent-in-training may be provided with either a bulletin board or pop-up window that shows the interaction between the servicing agent(s) and the customer. It is anticipated that agents may predefine ideal training scenario criteria before a contact is even received, and upon satisfaction of a number of the predefined criteria the agent may be notified of the training opportunity. The chosen agent may be notified in accordance with predetermined rules created to resolve issues where more than one agent has requested substantially similar training scenarios and/or criteria.

In some embodiments the level of trainee involvement with the customer may be automatically determined by an automated routine or by a determination made by the SME. In accordance with the present disclosure, the trainee may have total control over the interaction with the customer receiving advice on demand from the SME. Alternatively, the trainee may only be allowed to observe the interaction between the SME and the customer. Factors that may be used to determine a trainee's level of involvement may include without limitation, contact center policy, law, business rules, trainee experience level, call importance, the communication medium, a trainee's communication ability, past interactions, and/or combinations thereof. Allowing an agent-in-training to act as an observer, or as the one observed, while teamed with an SME, can provide the trainee with valuable experience and feedback. This training technique has the added benefit of testing a trainee's abilities without sacrificing quality and/or customer satisfaction in the event that the SME or other experienced agent needs to contribute to the interaction.

By dynamically teaming trainees with experts while at the same time solving real-world complex problems, the contact center increases its efficiency and customer service quality. This disclosure reduces the need for organizing simulated and/or real-world training sessions at specific times, and allows for the flexibility to train agents in a wide range of technical areas according to their bid preference. Moreover, it helps provide the highest quality service to the customer by continually providing opportunities for advanced agent training. These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to have a team of agents engage in training while servicing a contact.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
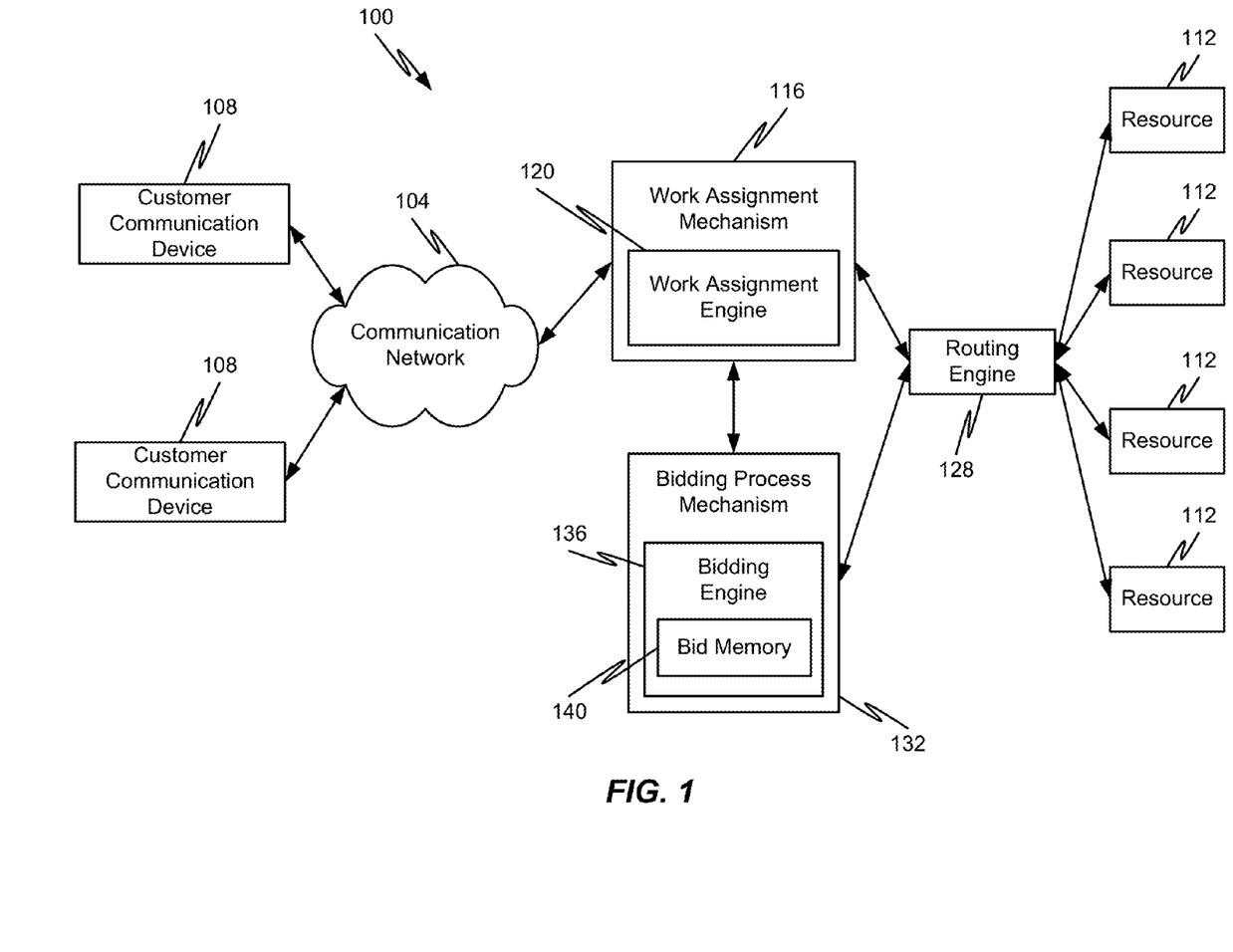
FIG. 1 is a block diagram depicting a contact center in accordance with an embodiment of the present invention.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, InfiniBand links, synchronous communications, asynchronous communications (e.g., Email, Chat, Instant Messaging (IM), Short Message Service (SMS), and the like), and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at a switch, routing engine 128, or server connected to the work assignment mechanism 116, or the like until a resource 112 is assigned to the work item representing that communication at which point the work assignment mechanism 116 passes the work item assignment decision to the routing engine 128 to connect the communication device 108 which initiated the communication with the assigned resource 112.

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In accordance with at least some embodiments of the present disclosure, the contact center 100 employs a bidding process mechanism 132 to offer specific agents the opportunity to train through teamed contact events. The bidding process mechanism 132 may comprise a bidding engine 136 and a bid memory 140. In some embodiments, the bidding engine 136 may be configured to analyze a given contact, generate bid invitations, receive bids, and select a winning bid. At times, the bidding engine 136 and may refer to the bid memory 140 to access and interpret stored information relating to a given bid and/or bidding agent(s). Specific embodiments of the bidding process are described in further detail in FIGS. 2-4. Alternatively, the bidding process mechanism 132 may create opportunities to bid on training for all incoming and/or outgoing contacts.

As part of the bidding process, the bidding engine 136 may review content associated with a contact to determine whether to create a bid invitation. This content may include information related to the customer, the nature of the contact, recommended agent technical skill, and/or an anticipated training value of the contact. In some embodiments, this content may be associated with at least one identifier acting as an instruction to the bidding engine 136 to create a bid invitation. Additionally, the bidding engine 136 may refer to a bid memory 140 to determine whether to create a bid invitation.

In some instances, it is anticipated that teamed training events may be reserved, even before a new bid invitation is created. These training reservations may be stored in the bid memory 140. Furthermore, the reservations may be made by an agent, a supervisor, automatically, and/or by another individual on behalf of an agent or group of agents. Creating a reservation can involve storing data associated with specific and/or general training criteria. This data may be stored in the bid memory 140. When a possible teamed training event is detected the bid memory 140 may be scanned for matching, or closely matching, criteria to that of the event.

Although reservations may be created and stored in the bid memory 140, the process of creating a bid invitation is not dependent on solely matching training criteria. For example, a training reservation may be assigned a score that can be used in deciding between creating a bid invitation and assigning the training event directly to one or more agents. In the event that a training reservation has a high score, it will have a higher likelihood of being assigned directly to the one or more agents associated with that training reservation. Score information may be stored in the bid memory 140.

In some embodiments, the bid memory 140 may be external to the bidding engine 136 and/or the bidding process mechanism 132. For example, the bid memory 140 may be maintained in the work assignment engine 120, the work assignment mechanism 116, and/or elsewhere that can be accessed by the bidding process mechanism 132. In accordance with embodiments of the present disclosure, it is anticipated the bid memory 140 and/or any other memory accessed during the bidding process can be located remotely from, or directly connected to, the contact center 100. Additionally, the bid memory 140 may also refer to partitions and/or sections of a memory structure and need not be directed to an entire memory structure. It is anticipated that the bidding process mechanism 132 may be external or internal to the work assignment mechanism 116 and even the work assignment engine 120.

Figure 2:
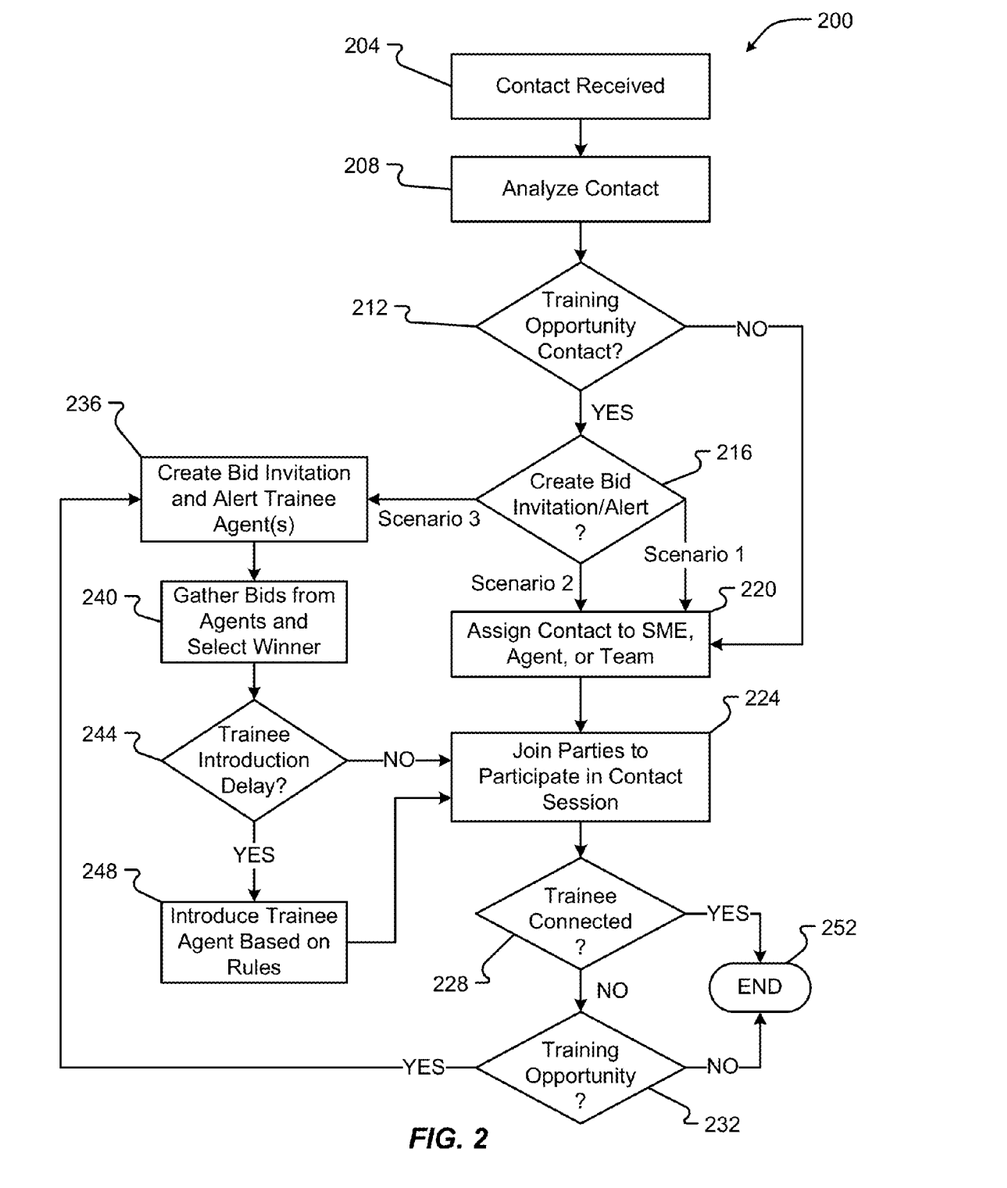
FIG. 2 is a flow chart depicting a first operational embodiment of the contact center in accordance with one embodiment of the present invention.

Referring now to FIG. 2, a flow chart of one embodiment of the bidding process and interaction with the contact center 100 is shown. The method begins at step 204 when a contact is initiated with the contact center 100. This initiation may include receiving a contact from outside the contact center 100 and/or initiating a contact from within the contact center 100. In any event, the method continues by analyzing the contact for training opportunities (step 208). Analysis of the contact may begin automatically by an IVR, or its equivalent, querying a participant for information relating to the nature of the contact. By responding to specific queries, the contact can then be coded accordingly, and in some cases designated as a recognized training event. Criteria defining possible training events may be stored in a memory 140 and compared to the coded contact to determine if a match exists, does not exist, and/or is close to the predefined criteria.

If the contact is not recognized as a possible training event, it may be directed to the work assignment mechanism 116 where it is then assigned to an agent, SME, and/or team (step 220).

If the contact is recognized as a possible teamed-training event, it is passed on to step 216 where the bidding process mechanism 132 determines whether to create an invitation to bid on the opportunity for an agent to receive training. This determination may involve referring to the bid memory 140 to analyze possible matching training event reservations. In one embodiment of the present disclosure, training reservations may be stored in the bid memory 140. These stored reservations may include score values to direct the bidding engine 136 to consult the work assignment mechanism 116 to assign one or more particular agents to the teamed-training event. For example, an agent may have a low number of awarded past training opportunities and as such may benefit from being awarded a higher score than one who has recently been awarded multiple training opportunities. Conversely, an agent may only need several more training opportunities to be considered a SME on a particular topic and as such the contact center may benefit from moving that agent's reservation to a higher score level for receiving training. It is anticipated that other factors may contribute to this determination of score. In one instance, the method for determining score may depend on contact center status.

When a particular training reservation meets a determined score-level, the bidding engine 136 may consult the work assignment mechanism 116 in teaming the agent, associated with the particular reservation, with the training event. In some embodiments, this score-based teaming may prevent the bidding engine 136 from creating a bid invitation. In other embodiments, it may be determined that another agent could benefit from being teamed with the first score-based teamed agent and also participate in the training event. This other agent may be determined through a bid process or by another score-based match. If a bid invitation is not required, the contact is directed to the work assignment mechanism 116 where it is then assigned to an agent, SME, and/or team (shown as Scenario 1 of step 220). Alternatively, the contact may be assigned to an agent, SME, and/or team (Scenario 2) while simultaneously creating a bid invitation (Scenario 3). In other words, it may be determined (at step 216) to create a bid invitation which triggers step 236 and the simultaneous assignment of an agent, SME, and/or team. In this example, a determined winner may be added to the assigned contact at step 224.

In some embodiments, the bidding engine 136 may determine to create an invitation for agents to bid on one or more training events. Following this determination, a bid invitation may be created (step 236). A bid invitation may include a destination, or invite, a description of the training event, and/or options for an invitee to respond. One example of a bid invitation's content will be described in further detail referring to FIGS. 5A and 5B. In preparing a bid invitation, the bid engine 136 may consult a bid memory 140 to determine possible invitees. In accordance with an aspect of the present disclosure, the bidding engine 136 is capable of preparing and sending the bid invitation to one or more agents. However, the bidding engine 136 may prepare the invitation for sending by another mechanism. This other mechanism may include the work assignment mechanism 116, the routing engine 128, and/or other mechanism.

The bidding engine 136 may also be used at least in part to gather one or more bid responses and select one at least one winning bidder (step 240). Selecting a winning bidder may depend on rules stored in the bidding engine 136 or other location accessible by the bidding engine 136. Rules may include, but are not limited to, using timing of the received responses as a selection criterion, analyzing attributes associated with a bidding agent, a random selection algorithm, programmed selection, and comparing attributes of a bid with those of the bidding agent. For example, if two bids are sent by individual agents, where one bid arrives at the bidding engine 136 before the other, the winner may be determined to be the first bid received. In general, these rules may be applied to all of the received bids or only a portion of the received bids depending on predetermined scenario.

At times it may be necessary to analyze the type of training event to determine whether introducing a trainee to the contact session should be delayed (step 244). To determine whether a delay is appropriate, the bidding engine 136 may review attributes associated with the training event, the type of contact, the winning bidder, the assigned agent, and/or combinations thereof. For example, if the type of contact is a text-based interaction and the training event is one where the trainee is restricted from interacting with the customer, a delay may not be considered appropriate and the trainee may be introduced to the contact immediately (see step 224). On the other hand, if the contact is a voice-based interaction, and the trainee is predicted to interact with the contact, then a delay may be deemed appropriate. In the event that a delay is considered appropriate, the method continues at step 248.

In some embodiments, the delayed introduction of one or more trainee agents may be governed by specific introduction rules (step 248). These introduction rules may include using a timer and/or timed countdown, waiting for a break or pause in the communication, and/or providing a notification to one or more parties in the contact, etc. For example, if a voice-based contact session is in progress between at least one agent and a customer, the introduction rules may wait for a pause in the voice stream to introduce the trainee agent. The introduction and corresponding delays described herein may be processed by the bidding engine 136.

The method continues at step 224 where one or more trainees are teamed with an assigned agent, SME, or team (assigned at step 220). As can be appreciated, joining the at least one trainee with the contact session may include several levels of involvement. In some embodiments, the trainee agent may direct the contact session while being monitored by the assigned agent, SME, or team. On the other hand, the at least one trainee agent may be a silent observer of the contact session. It is anticipated that varying levels of trainee involvement may be determined by the bidding engine 136.

It is anticipated that during an established contact session a training opportunity may arise or become apparent to an agent, SME, or team associated with the contact session. In some embodiments, this occurrence may trigger the creation of at least one new bid invitation. Specifically, the method continues by determining whether a trainee is connected with the contact session and determining if a training opportunity exists (step 228 and 232). Although the determination of whether a training opportunity has arisen may be made by an agent, SME, or team, it is anticipated that this determination may be made automatically. In addition, the process of determining whether a trainee is connected to the session may be performed automatically, for example, by at least analyzing data stored in the bid memory 140 and/or referring to the contact session to determine currently connected parties.

Figure 3:
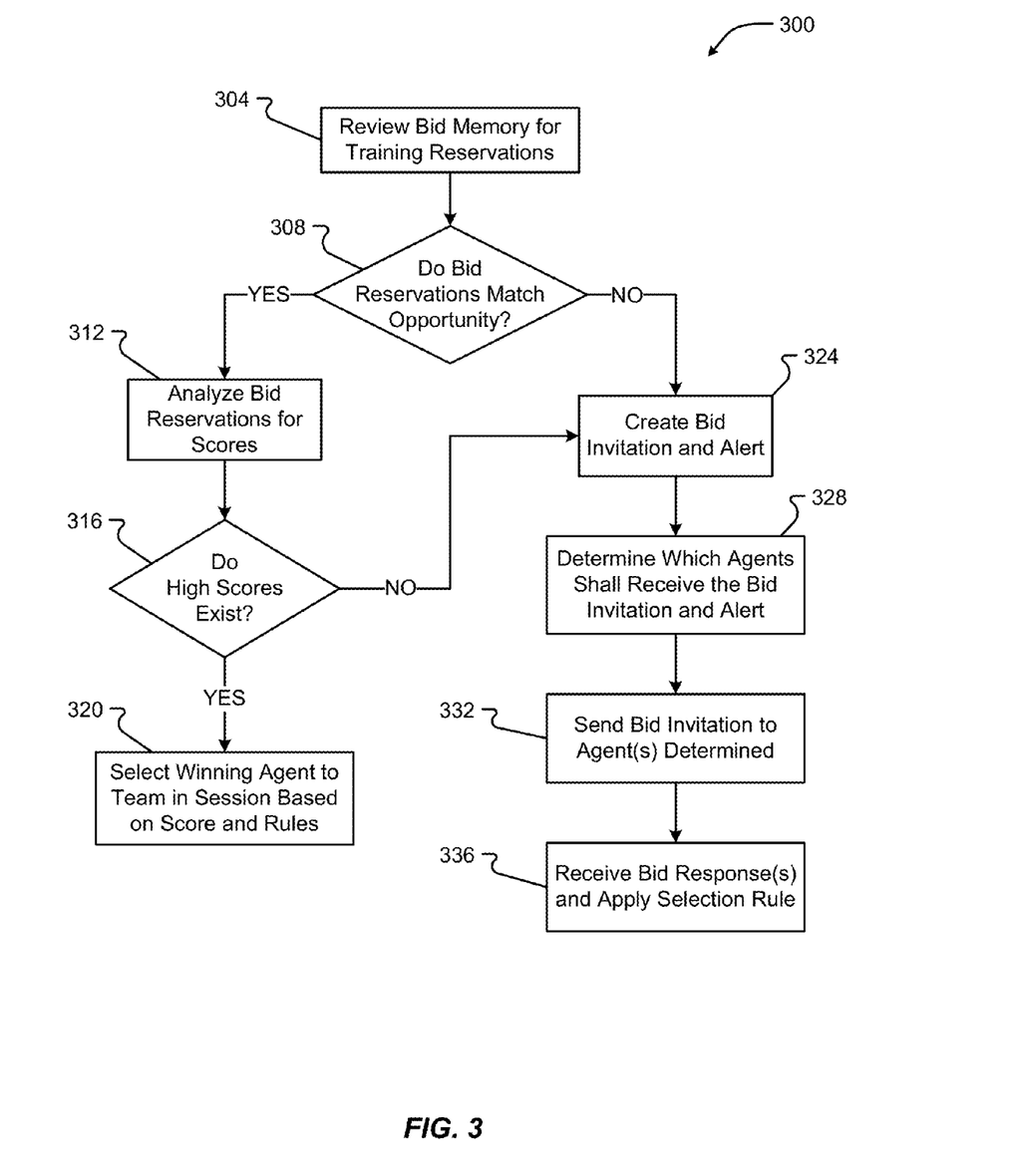
FIG. 3 is a flow chart depicting a second operational embodiment of the contact center in accordance with one more embodiment of the present invention.

Referring to FIG. 3 a method of adaptively creating bid invitations will be discussed in accordance with embodiments of the present invention. The method begins at step 304, where the bidding engine 136 reviews the bid memory 140 for training reservations. Reviewing training reservations may include accessing data associated with the content of a reservation. Alternatively, training reservations may be arranged in some manner to allow a more efficient review process. This arrangement of a reservation may include the arrangement of bits that comprise the reservation.

In some embodiments, the bidding engine 136 reviews the bid memory 140 for training reservations that may match at least one training event (step 308). It is anticipated that the criteria used in determining one or more matches may include a closest-match and/or other determinative process used to pair at least one reservation with at least one training event. In the event that one or more training reservations are determined to match the at least one training event, the reservation(s) may be analyzed for score identifiers (step 312). Alternatively, if no bid reservations match the training event, the method continues (at step 324) by creating a bid invitation.

In accordance with an embodiment of the present disclosure, training reservations may be associated with score data. This score data may relate to at least one agent, bid, training event, and/or time associated with a bid reservation. The time associated with a bid reservation may further include, but is not limited to, the time received by the bid memory and/or the time that the reservation was placed. As can be appreciated, the time associated with a reservation may be created by synchronizing with a particular clock and/or timing signal.

The method continues at step 316 where any high scores associated with one or more bid reservations are determined. In some embodiments, the high scores may relate to data, bits, and/or the reservation structure that may be used to distinguish a particular reservation. This classification may include identifying characteristics that cause a reservation to be awarded a higher rank in selecting a winner for the customer service teaming and training event. In some cases, high scores may or may not exist. Specifically, the high score data may be used by the bidding process mechanism 132 to bypass the creation of a bid invitation.

In some embodiments, a winning reservation may be selected based on score and/or other rules (step 320). In one embodiment, the rules may dictate that the reservation with the highest score is awarded the opportunity to participate in the training event. It is a further aspect of the present disclosure to allow timing rules, presence, training history, agent information, and other information to be used in determining a winner. In the event that no high scores exist, the method continues (at step 324) by creating a bid invitation and alert.

In accordance with one aspect of the present disclosure, the bidding process mechanism 132 may create one or more bid invitations (step 324). A bid invitation may include an alert function to, among other things, notify recipients of the status of an invitation. In general, a bid invitation may contain at least one training event description, selection options, reservation options, and/or behavioral options. For example, a bid invitation may contain information regarding the type of contact and/or training event details. Additionally, the invitation may be structured such that an individual may submit a response to the bid invitation. This response may include accepting, denying, closing, auto-accepting, auto-denying, and/or otherwise ignoring the invitation. Further, the response may include a reservation option that stores an agent's request to reserve a training event into a bid memory 140. This bid memory 140 may be reviewed for reservations as described herein.

In some embodiments, the bidding engine 136 may determine which agents shall receive the bid invitation (step 328). Bid invitations may be sent to any and/or all agents. Moreover, the invitation may be sent to those agents who previously submitted reservations. It is anticipated that the bidding engine 136 may refer to the bid memory 140 to determine specific recipients of the bid invitation. Furthermore, the determination of recipients may depend on such criteria as agent training history, contact type, specialization of agent, customer request, agent presence, rules, and/or other characteristics. For example, rules may state when an agent is allowed to bid. In this scenario, the rules may state that an agent is only allowed to bid when not handling a call.

In addition to determining which agents will receive the bid invitation, some embodiments may provide various alerts to selected agents. In general, an alert may include any type of notification that serves to make an agent aware of a bid invitation. Alerts may include some form of interpretable notification such as audible, visual, tactile, and/or combinations thereof. Rules may be used in determining whether one or more agents are sent an alert. Furthermore, rules may exist that modify an alert structure depending on one or more agents' status. For instance, a rule may be structured to include only a visual cue where an agent is engaged in a voice call. Additionally, an audible tone may accompany a bid invitation alert if a bid invitation and/or agent allows audible tone alerts.

In some embodiments, different alerts may be sent to different agents depending on conditions. In other words, the bidding process mechanism 132 may not necessarily send identical alerts to each selected agent. When creating an alert for a given agent or agents, the bidding engine 136 may refer to these conditions, which may be related to at least one of presence information, endpoint status, agent preferences, contact type, agent status, contact preferences, customer information, rules, and the like. It is anticipated that these conditions may be overridden in accordance with other rules.

The method continues at step 332 by the bidding process mechanism 132 sending the bid invitation to the agents. As stated above, the agents may have been selected depending on rules. Alternatively, all agents may receive a bid invitation. It is anticipated that bid alerts may accompany one or more of the bid invitations. In sending the bid, the bidding process mechanism 132 may work together with the work assignment module 116 and the routing engine 128. The bidding process mechanism 132 may work directly with the routing engine 128 to reach one or more agents and/or resources 112.

After receiving the bid invitation, the agent may send a response to the bidding process mechanism 132 to indicate that agent's preference. Preferences may include acceptance of the bid invitation, denial of the bid invitation, reservation of future bid invitations, and the like. When the bidding process mechanism 132 receives at least a first response, it may apply selection rules to determine a bid winner. The process of determining a bid winner may involve the bidding engine 136 referring to a bid memory 140 to use rules in selecting a winner. Another embodiment may allow the bidding engine 132 to use the response receipt order as a determinative selection tool.

Figure 4:
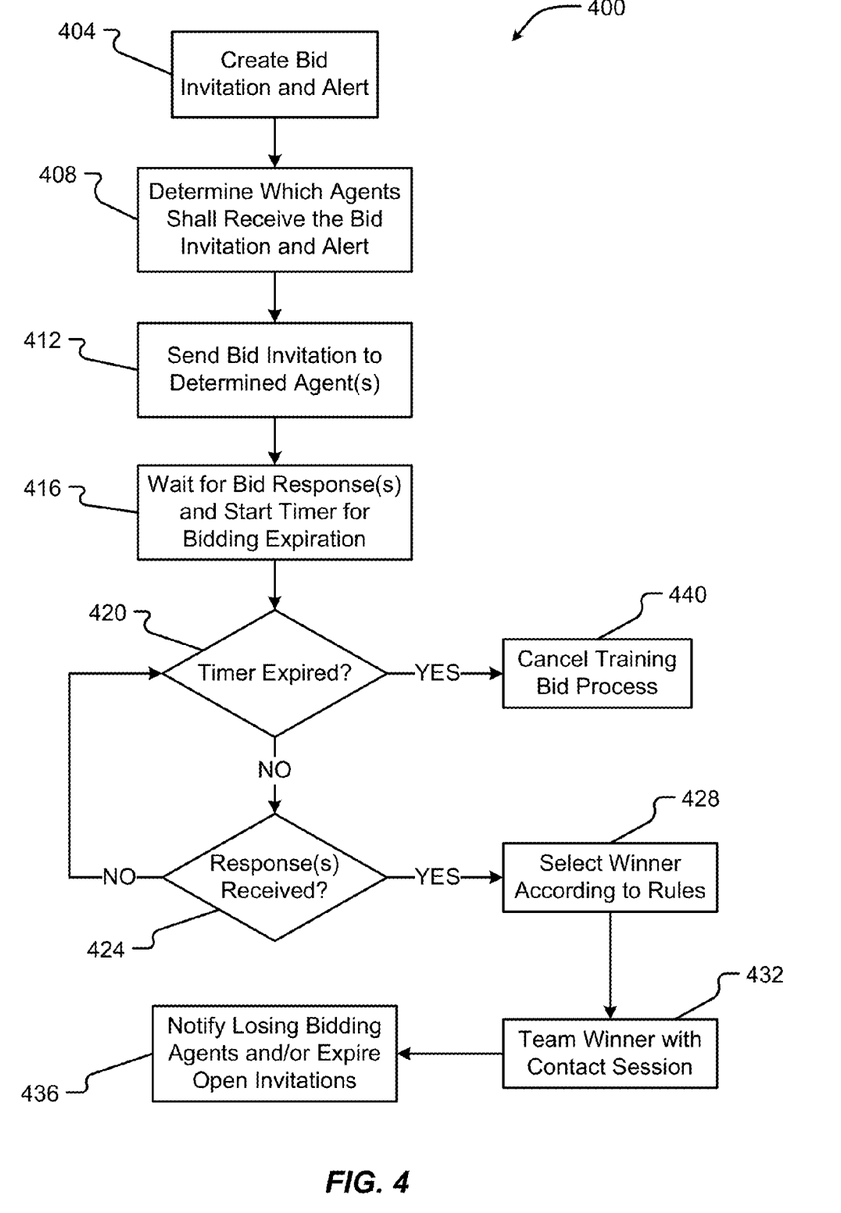
FIG. 4 is a flow chart depicting a third operational embodiment of the contact center in accordance with yet a further embodiment of the present invention.

FIG. 4 depicts a bid invitation creation and selection process in accordance with embodiments of the present disclosure. Specifically, the method begins where the bidding process mechanism 132 creates one or more bid invitations (step 404). As described above, a bid invitation may include an alert function to, among other things, notify recipients of the status of an invitation. It is one aspect of the present disclosure to allow a timer to be specified during the creation of the bid invitation. The specification of a timer may be used to determine the length of time that the bidding process mechanism will wait for responses to the bid before the bid process is terminated. This aspect of the disclosure is described in further detail below.

In some embodiments, the bidding process mechanism 132, and more specifically the bidding engine 136, may determine which agents among the plurality of agents in the contact center may receive a bid invitation (step 408). Selecting which agents receive a bid invitation may depend on a number of rules. These rules may be stored in the bid memory 140.

As previously described, a bid invitation alert may include any type of notification that attempts to make an agent aware of a bid invitation. These alerts may include one or more forms of notification such as an audible, visual, tactile, and/or electrical stimulus. The alert may be a part of the bid invitation. Additionally, an alert may be separate from the bid invitation. The bidding engine 136 may use rules to determining whether an alert is a part of a bid invitation or if it is separate from it. Moreover, at least one alert may be sent on or about the same time that one or bid invitations are sent.

The bidding process mechanism 132 sends at least one bid invitation to one or more agents (412). These agents may have been selected according to rules in the determinative step 408. Bid invitations and/or alerts may be sent by the bidding process mechanism 132. In accordance with at least one embodiment of the present disclosure, the bidding process mechanism 132 may work directly with the routing engine 128 to reach one or more agents and/or resources 112. In some embodiments, the bidding engine 136 may communicate with the work assignment mechanism 116 in sending bid invitations and/or alerts.

In some embodiments, the bidding process mechanism 132 waits for an agent response after sending a bid invitation (step 416). To prevent timeout errors, infinite loops, and/or other process issues, a timer is created while the bidding process mechanism 132 awaits responses. As disclosed, the timer may include any mechanism that can be used to determine time, such as a clock, computer processor, A/C voltage, power source, signals measured, and/or other repeatable electrical stimulus.

As the method continues, the bidding process mechanism 132 may receive responses (step 424) from one or more agents, or the timer may expire (step 420). If the bidding engine 136 determines that the timer has expired (step 420), the training bid process may be terminated (step 440). In the event that the bidding process is terminated, the training event may be awarded to one or more prioritized, or non-prioritized, reservations stored in the bid memory 140. Alternatively, the training bid process may go abandoned, in which case no trainee agent is assigned to the training event.

The bidding process mechanism 132 detects whether bid responses have been received (at step 424). In receiving the responses, the bidding engine 136 may use counters, timers, selection criteria, and/or other mechanisms to determine when to evaluate at least one winning bidder. For example, the bidding process mechanism 132 may require receiving at least three different bid responses before choosing a winner. In this example, if less than three responses are received and the expiration timer expires, the method continues at step 440. However, if an appropriate number of responses is received, the method may proceed to step 428, selecting a winner.

When the bidding process mechanism 132 receives at least a first response, it may apply selection rules to determine a bid winner in accordance with other implemented rules (step 428). These other implemented rules may include the counters, timers, selection criteria and other mechanisms described above. The process of determining a bid winner may involve the bidding engine 136 referring to a bid memory 140 to use rules in selecting a winner. Another embodiment may allow the bidding engine 132 to use the order of received responses in determining at least one winning bid. For example, one or more bid responses may be reviewed and compared against a stored set of criteria. Contained in this criteria may be data relating to the agent, training, preferred contacts, and the like. In this instance the one or more bidders with the closest matching criteria wins the bid.

The winning bid is then teamed with the contact session training event (step 432). In some embodiments, more than one winning bid may have been made. It is anticipated that more than one winning bidder may be teamed with the contact session. As described herein, teaming the trainee with the contact session may involve introductions, delays in introduction, and/or no introduction. These introduction determinations may depend on contact type, level of trainee involvement, training type, and the like. Teaming may be coordinated by the work assignment mechanism 116 and routing engine 116. Alternatively, the teaming may be achieved by the bidding process mechanism 132 and the routing engine 116. It is further anticipated that if a plurality of winning bidders are selected, the winners may be introduced to the session in parallel or serially. The manner of introduction by which multiple winners are teamed with a session may be determined by the bidding engine and/or other rules engine.

In accordance with some embodiments of the present disclosure, the losing bidder(s) may be notified of a lost bid (step 436). This notification may appear as part of the original bid invitation, the bid invitation alert, or it may be separate from the invitation and/or alert. When at least one winning bid is selected by the bidding engine 136, a notification may be sent to one or more losing bidders by the bidding engine 136.

Figure 5A:
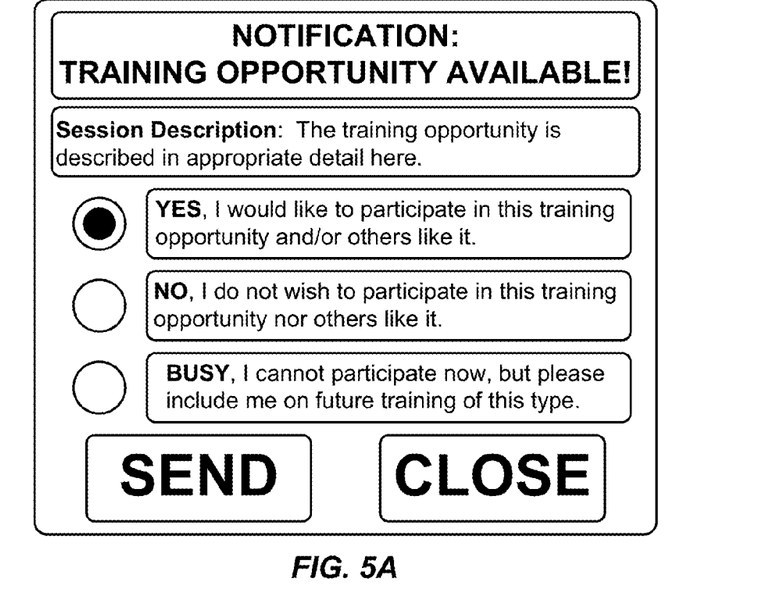
FIG. 5A depicts a notification alert in accordance with an embodiment of the present invention.

Referring now to FIG. 5A a sample notification of a training bid invitation is shown in accordance with embodiments of the present disclosure. In some embodiments the notification may contain at least one of a response mechanism, an alert feature, a reservation feature, an interactive mechanism, descriptive feature, and the like. The behavior of a received bid invitation notification may follow rules determining the position of display, window size, display colors, and dynamic features. For example, if the bid invitation notification may be configured to flash, change colors, always stay on top of other windows, and/or incorporate other features designed to illicit a response. Other embodiments may also employ the use of sound and/or tactile stimuli to also illicit a response from a resource 112.

Figure 5B:
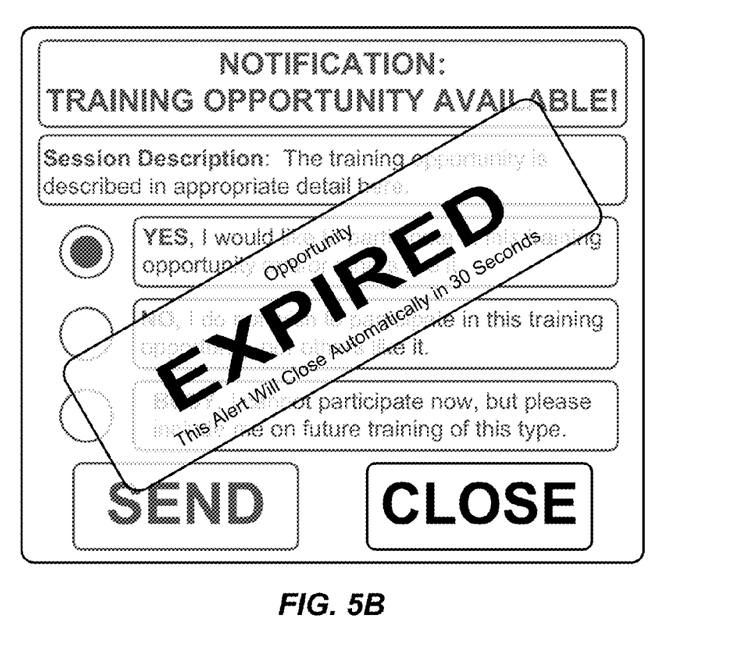
FIG. 5B depicts a notification alert in accordance with another embodiment of the present invention.

FIG. 5B shows a sample expired notification of a training bid invitation in accordance with embodiments of the present disclosure. As described above, notifications, alerts, and the like may expire, be rescinded, and/or update to relay new information. In some embodiments, this dynamic notification may include a timer to expire after a specific stimulus. In other embodiments, a losing bidder may be notified through the mechanism of an expired notification warning. However, the notification of a lost bid may be separate from the training bid invitation and/or bid notification.

Figure 6:
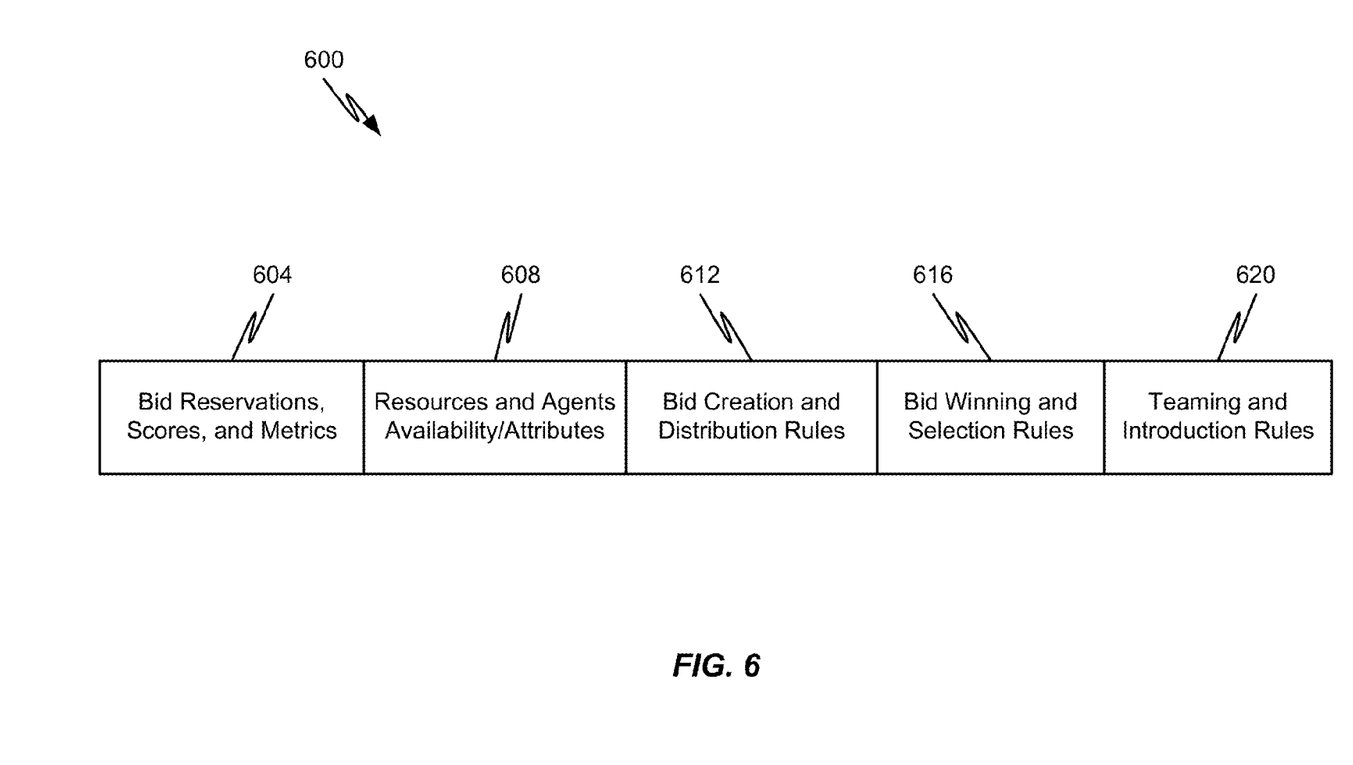
FIG. 6 is a block diagram depicting a data structure used in accordance with embodiments of the present disclosure.

FIG. 6 depicts one example of a data structure 600, which may be generated and used by the various components of the contact center. In particular, the bidding process mechanism 132, bidding engine 136, work assignment engine 120 and/or other components may use the data structure 600 or multiple similar data structures to facilitate the bidding process as described herein. In some embodiments, a single data structure 600 may comprise the data necessary for the bidding process mechanism to analyze contact sessions for bid opportunities, review and maintain bid reservations, determine to create and send bids, select one or more winners, and team selected winners with the contact. Alternatively, the contact center may employ the use of different data structures that may be similar but do not necessarily have to have the exact same data fields as shown in FIG. 6.

The example data structure 600 depicted comprises a plurality of data fields that contribute, at least in part, to the process of bidding on training events. Examples of such data fields include, without limitation, a bid reservation field 604, a resources and agents field 608, a bid creation and distribution rules field 612, a bid winning and selection field 616, and a teaming and introduction rules field 620.

The bid reservation field 604 may comprise data which describes existing bid reservations. In some embodiments, the bid reservation field 604 includes an identifier related to the resource 112 associated with a bid reservation. Moreover, the bid reservation field 604 may further include a bid score. In other embodiments, the bid reservation field 604 may include a queue position, estimated wait time (EWT), estimated service time (EST), and the like.

The resources and agents field 608, on the other hand, may comprise data relating to one or more resources and any associated agents. The data in this field may store a resource and/or agent's instantaneous and/or predicted availability. Availability may be determined by presence detection techniques and/or configurable status indicators. Furthermore, the data field may store training information related to one or more agents.

The bid creation and distribution rules field 612 may comprise automated routines, algorithms, and/or other rules to determine one or more of: 1) whether to create a bid invitation, 2) the structure of the bid invitation, 3) recipients of a bid invitation, and 4) what rules to follow in the event that a bid invitation is not created. Instructions may be contained in the bid creation and distribution rules field 612 to direct one or more automated routines, or the like, to refer to other data fields of the data structure 600 or other data structures.

The bid winning and selection rules field 616 may comprise automated routines, algorithms, and/or other rules that, without limitation: 1) receive bid responses, 2) queue and or prioritize bid responses, 3) receive and cause bid invitation reservations, and/or refusals, to be stored in a memory, 4) determine one or more winning bid responses, and 5) select one or more winning bid responses for teaming. Upon receiving bid responses, the bid winning and selection rules field 616 may select bids according to time arrived, scores associated with a bid response and/or resource, other routines and criteria, or combinations thereof. In selecting a resource, the rules may include referring to the bid reservations field 604, analyzing score, and/or selecting from a group of bid responses. Determination of one or more winners may also be effected by reviewing received bid responses and may further involve referring to the resources and agents field 608. Data relating to an agent's training history, preferred communication type, and/or other attributes may be used in determining a winner.

The teaming and introduction rules field 620 may comprise rules for teaming one or more agents with a contact session. It is anticipated that the one or more agents may have been determined by the bid winning and selection rules 612. A contact session may exist between at least one other agent and a customer, a plurality of agents, and/or a customer before teaming at least one winning resource. Teaming the at least one winning agent may depend on introduction rules. These introduction rules, including delays, the use of formal or informal announcements, non-announcement introductions, and the like may be determined by referring to attributes associated with the winning agent. These attributes may be stored in the resources and agents field 608. In some embodiments, introduction may depend on rules based on the contact and/or media type.

The present disclosure, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving, at a contact center, a contact with at least a first customer, wherein the contact includes an identifier to classify a contact context;
   determining, by at least one processor of the contact center, a subject matter expert to assign to the contact, wherein the subject matter expert is qualified to provide training associated with the contact;
   assigning, by the at least one processor of the contact center, the subject matter expert to the contact;
   determining, by the at least one processor of the contact center, based on the contact context, whether servicing the contact qualifies as a training event;
   in response to determining that servicing the contact qualifies as a training event, and after assigning the subject matter expert to service the contact, selecting, by the at least one processor of the contact center, one or more resources to participate with the subject matter expert in servicing the contact;
   referring to a first memory location to determine whether the one or more resources will be sent a bid invitation to bid on the training event;
   sending the bid invitation to the determined one or more resources;
   receiving one or more bid responses from the determined one or more resources;
   determining, by the at least one processor of the contact center, at least one winning bid response from the one or more bid responses, wherein the at least one winning bid response is made by a winning bidder; and
   joining the winning bidder with the subject matter expert and the at least a first customer contact.

2. The method of claim 1, wherein the identifier is a characteristic that is associated with one or more of the contact, training event, a resource, a processing capability, and the customer.

3. The method of claim 1, wherein determining whether the contact qualifies as a training event further comprises:
   referring to a second memory location containing data related to at least one training event;

comparing the data related to the at least one training event to data associated with the contact; and coding the contact such that (i) the contact qualifies as a training event, where the data relating to the at least one training event matches the data associated with the contact, and (ii) the contact does not qualify as a training event, where the data relating to the at least one training event does not match the data associated with the contact.

4. The method of claim 1, wherein the one or more resources participate with the contact by at least one of observing, interacting, handling, and teaming with another resource.

5. The method of claim 1, wherein the referring step further comprises:
   determining that the first memory location stores at least one reservation for a training event;
   analyzing the at least one reservation for a score identifier; and
   sending a bid invitation to the one or more resources associated with the at least one reservation containing the score identifier.

6. The method of claim 5, wherein the bid invitation is only sent to the one or more resources associated with the at least one reservation containing the score identifier.

7. The method of claim 1, wherein the referring step further comprises:
   determining that the first memory location stores at least one reservation for a training event;
   analyzing the at least one reservation for a score identifier;
   determining that the score identifier associated with at least one reservation is of a specific rank that requires sending at least one bid invitation to one or more resources listed in memory;
   sending at least one bid invitation to the one or more resources listed in the first memory location.

8. The method of claim 1, wherein the bid invitation includes an alert configured to notify a resource of the presence of the bid invitation.

9. The method of claim 1, wherein the bid response includes at least one of an acceptance, a denial, and a reservation of a future training event.

10. The method of claim 9, wherein the reservation is stored in the first memory location and is associated with one or more resources, and wherein the reservation is configured to match a similar contact context of the present bid invitation.

11. The method of claim 1, wherein determining the at least one winning bid response further comprises:
    reviewing, by the at least one processor of the contact center, the received one or more bid responses;
    referring to the first memory location for rules to apply in selecting at least one winning bid response;
    selecting, by the at least one processor of the contact center, the at least one winning bid response based on the rules; and
    sending a notification to the one or more resources associated with the one or more bid responses, wherein the notification is configured to inform the one or more resources as to a status of the bid invitation.

12. The method of claim 11, wherein the notification is sent to the winning bidder having the at least one winning bid response and further informing the one or more resources that the bid has been won.

13. The method of claim 12, wherein the notification is sent to at least one losing bidder having at least one losing bid response and further informing the at least one losing bidder that the bid has been won by at least one other resource.

14. The method of claim 1, wherein joining the winning bidder further comprises:
    determining whether to introduce an agent to the contact; and
    connecting the agent with the contact as allowed by the determined introduction.

15. The method of claim 14, wherein determining whether to introduce the agent depends on rules stored in the first memory location.

16. A non-transitory computer readable medium comprising executable instructions that, when executed by a processor, perform the method of claim 1.

17. A contact center, comprising:
    an input operable to receive a first contact from a first customer;
    a memory configured to store processing rules and instructions that determine a subject matter expert to assign to service the first contact, wherein the subject matter expert is qualified to provide training associated with servicing the contact, assign the subject matter expert to service the first contact, determine that the contact qualifies as a training event, select one or more resources to participate with the subject matter in servicing the contact, refer to a first memory location to determine whether the one or more resources will be sent at least one bid invitation to bid on the training event, create and send the at least one bid invitation to the determined one or more resources, receive one or more bid responses, determine at least one winning bid response from the received one or more bid response, wherein the at least one winning bid response is made by a winning bidder, and join the winning bidder with the subject matter expert and the first customer; and
    a processor configured to execute the rules and instructions stored in the memory.

18. The contact center of claim 17, wherein the notification is sent to the winning bidder having the at least one winning bid response and further informing the one or more resources that the bid has been won.

19. The contact center of claim 17, wherein the memory further comprises instructions to evaluate skills associated with at least one agent of the one or more resources.

20. The contact center of claim 17, wherein the memory further comprises instructions to create at least one alert to accompany the at least one bid invitation, wherein the alert is configured to notify the one or more resources of the bid invitation.

* * * * *

UNITED STATES PATENT AND TRADEMARK OFFICE
CERTIFICATE OF CORRECTION

PATENT NO. : 8,718,268 B2
APPLICATION NO. : 13/407524
DATED : May 6, 2014
INVENTOR(S) : Robert C. Steiner, Andrew D. Flockhart and Joylee Kohler Page 1 of 1

It is certified that error appears in the above-identified patent and that said Letters Patent is hereby corrected as shown below:

Claims

Claim 7, column 17, line 34, after "in memory;" insert --in memory; and-- therein.

Claim 17, column 18, line 33, after "subject matter" insert --expert-- therein.

Signed and Sealed this
Fifteenth Day of September, 2015

Michelle K. Lee
*Director of the United States Patent and Trademark Office*